(12) United States Patent
Sato

(10) Patent No.: US 8,965,105 B2
(45) Date of Patent: Feb. 24, 2015

(54) IMAGE PROCESSING DEVICE AND METHOD

(75) Inventor: Teruyuki Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 539 days.

(21) Appl. No.: 13/316,964

(22) Filed: Dec. 12, 2011

(65) Prior Publication Data

US 2012/0154544 A1   Jun. 21, 2012

(30) Foreign Application Priority Data

Dec. 15, 2010   (JP) .................... 2010-279342

(51) Int. Cl.
*G06K 9/00*   (2006.01)
*H04N 15/00*   (2006.01)
*H04N 13/00*   (2006.01)
*G06T 5/00*   (2006.01)

(52) U.S. Cl.
CPC ............ *H04N 13/0022* (2013.01); *G06T 5/006* (2013.01); *H04N 2013/0081* (2013.01); *G06T 2207/10012* (2013.01)
USPC .................. 382/154; 348/43; 348/47; 348/51

(58) Field of Classification Search
CPC   G06T 15/00; G06F 3/04815; H04N 13/0007; H04N 13/0203
USPC ........................................................ 382/154
See application file for complete search history.

(56) References Cited

U.S. PATENT DOCUMENTS

| | | | | |
|---|---|---|---|---|
| 6,111,597 | A * | 8/2000 | Tabata | 348/43 |
| 2006/0289757 | A1* | 12/2006 | Kochi et al. | 250/310 |
| 2009/0175497 | A1* | 7/2009 | Anai et al. | 382/103 |
| 2011/0090215 | A1* | 4/2011 | Ohta | 345/419 |
| 2011/0292045 | A1* | 12/2011 | Nakamura et al. | 345/419 |

FOREIGN PATENT DOCUMENTS

| | | |
|---|---|---|
| JP | 1998-224820 | 8/1998 |
| JP | 2009-103980 | 5/2009 |
| JP | 2009-177565 | 8/2009 |
| WO | WO 2010090150 A1 * | 8/2010 |

* cited by examiner

*Primary Examiner* — Amir Alavi
*Assistant Examiner* — Kenny Cese
(74) *Attorney, Agent, or Firm* — Oblon, Spivak, McClelland, Maier & Neustadt, L.L.P.

(57) ABSTRACT

An image processing device includes; a first detecting unit that inputs a first image and a second image and detects a first positional aberration between the first image and the second image; a correcting unit that corrects the first positional aberration detected by the first detecting unit in the first image; a second detecting unit that detects a direction of the second positional aberration between the corrected first image and the second image; and a determining unit that determines an image orientation at the display of the first image and the second image based on the detected direction of the second positional aberration relating the trial image corresponding to the sparsest blur kernel to the target image.

12 Claims, 14 Drawing Sheets

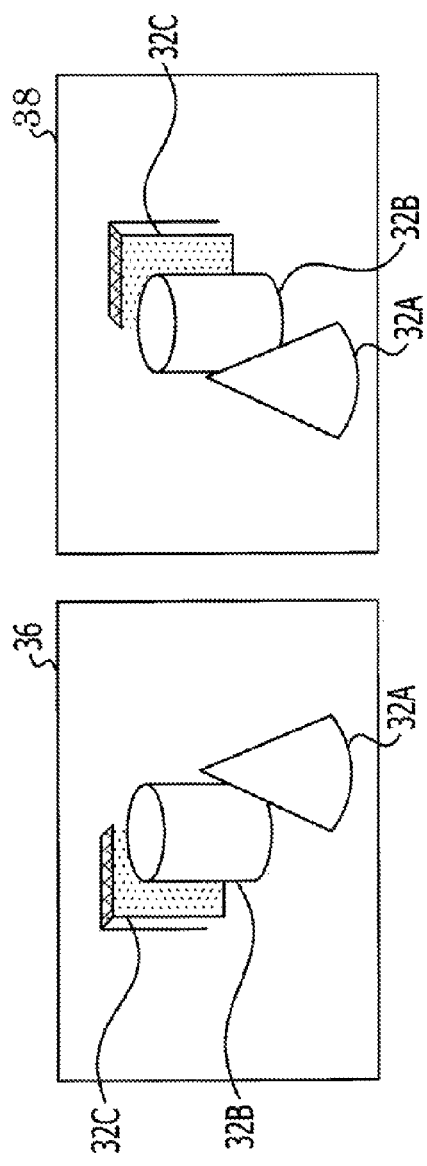

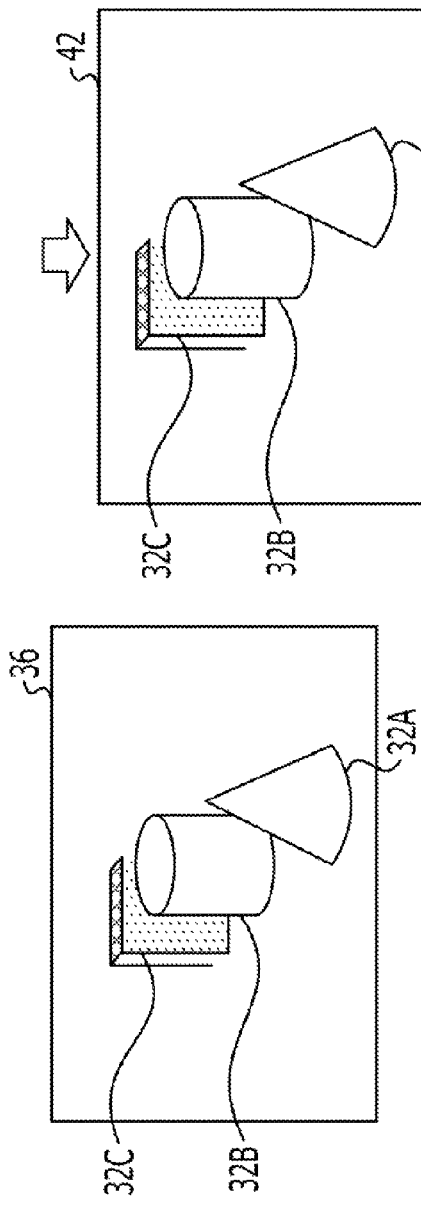
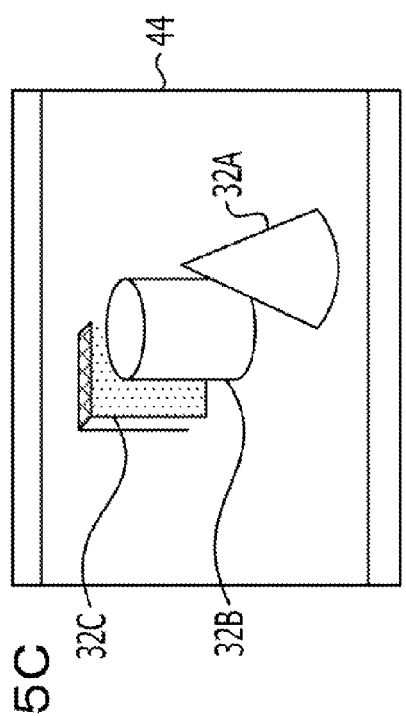

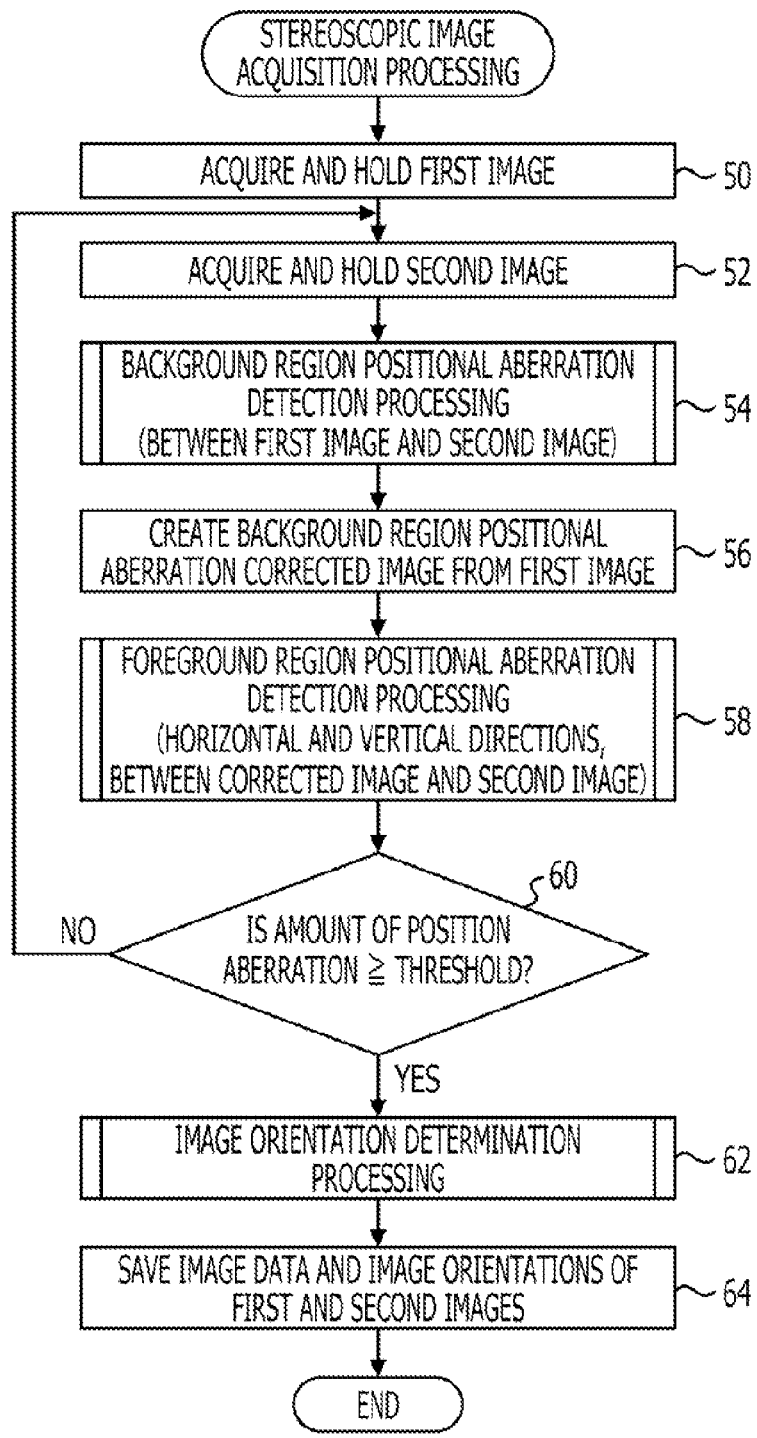

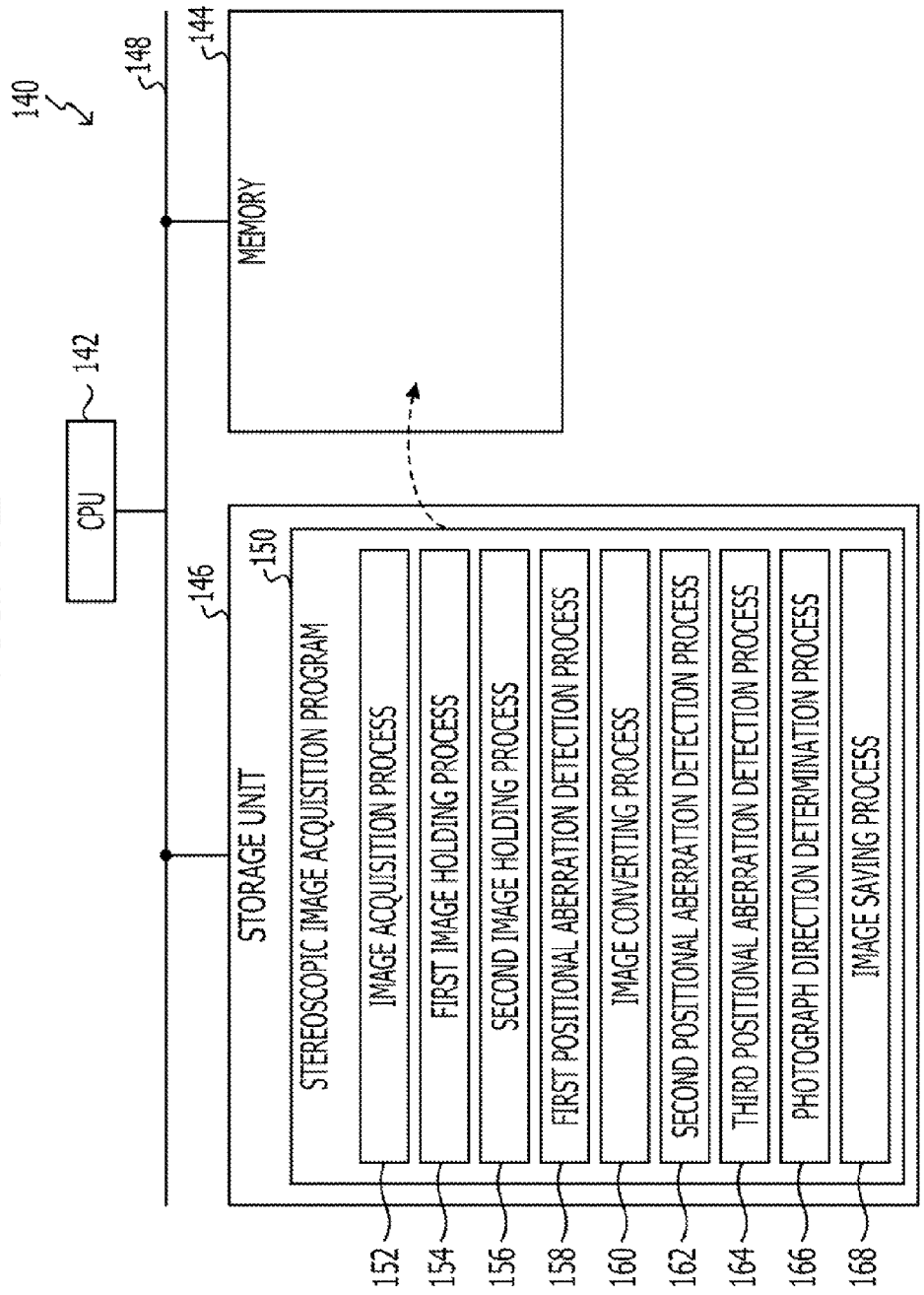

IMAGE PROCESSING DEVICE AND METHOD

CROSS-REFERENCE TO RELATED APPLICATIONS

This application is based upon and claims the benefit of priority of the prior Japanese Patent Application No. 2010-279342, filed on Dec. 15, 2010, the entire contents of which are incorporated herein by reference.

FIELD

The present invention relates to an image processing device and an image processing method.

BACKGROUND

When a photograph is taken by a photograph device, an orientation in which the length direction of an image is approximately horizontal (landscape) or an orientation in which the length direction of an image is approximately vertical (portrait) can be selected according to the object to be photographed and the like. As a result, there is a need among users to take a photograph in a desirable image orientation even when a stereoscopic image photograph is taken which has a parallax equivalent to or close to a binocular parallax.

A technique is known that provides multiple imaging units in a photograph device such that a configuration of the photograph device can rotate around a photograph optical axis of each imaging unit according to the orientation of the image to be photographed (Japanese Laid-open Patent Publication No. 1998-224820, Japanese Laid-open Patent Publication No. 2009-177565).

Furthermore, a related technique is known in which a photograph device that is provided with a monocular imaging unit is equipped with a triaxial acceleration sensor. The device detects a panning operation based on the sensor output and recognizes the orientation of the image to be photographed (Japanese Laid-open Patent Publication No. 2009-103980).

SUMMARY

An image processing device includes; a first detecting unit that inputs a first image and a second image and detects a first positional aberration between the first image and the second image; a correcting unit that corrects the first positional aberration detected by the first detecting unit in the first image; a second detecting unit that detects a direction of the second positional aberration between the corrected first image and the second image; and a determining unit that determines an image orientation at the display of the first image and the second image based on the detected direction of the second positional aberration.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3A is an example of a photographic image.

FIG. 3B is an example of an image photographed at a shooting position different from the photographic image of FIG. 3A.

FIG. 3C illustrates a combined image in which positional aberration of the background regions of the photographic images in FIG. 3A and FIG. 3B is corrected.

FIG. 5A is an example of a photographed image.

FIG. 5B illustrates an example of an image changed in a direction perpendicular to the shooting position moving direction of the imaging unit in the image due to camera shake, and photographed at a different shooting position.

FIG. 5C illustrates a combined image in which positional aberration of the background regions of the photographic images in FIG. 5A and FIG. 5B is corrected.

FIG. 6 is a flow chart illustrating stereoscopic image acquiring processing according to a first embodiment.

FIG. 12 is a schematic block diagram illustrating an example of a hardware configuration in a state where the stereoscopic image acquiring device is realized by a program.

DESCRIPTION OF EMBODIMENT(S)

Herein below, problems with the above techniques will be organized followed by an explanation of the embodiments.

A stereoscopic image is desirably displayed in an orientation in which a direction of parallax of the image corresponds to the direction in which the eyes of a viewer are arranged. As a result, sensing of the image orientation is necessary at the display or output of a stereoscopic image if the photograph device is configured to allow for shooting of the stereoscopic image in a desired orientation. The image orientation to be displayed can be sensed, for example, from the image orientation at shooting. Moreover, the image orientation at the shooting can be sensed according to the image orientation around a photograph optical axes of imaging units, if the stereoscopic image is shot by a photograph device provided with, for example, multiple imaging units that can be rotated around the photograph optical axis. Further, the orientation of a stereoscopic image shot by a photograph device provided with a monocular imaging unit and a triaxial acceleration sensor can be sensed according to an output of the triaxial acceleration sensor.

However, with the abovementioned technology, the need to acquire different information for the type of configuration (model) of each photograph device arises in order to sense the image orientation to be displayed, in addition to the photographed data. If the photograph device is equipped with a function to output a stereoscopic image display and the like, it is difficult to share programs that achieve the above functions without learning about the configuration of the photograph device if the type of information used in detecting the image orientation for displaying the image disagrees with each photograph device configuration. Specifically, the need arises to develop a program to achieve the above functions for each type of photograph device configuration (model) without ensuring the versatility of programs to realize the above functions. Moreover, when an output device for outputting stereoscopic image displays and the like is provided separately from the photograph device, the need arises to incorporate a function into the output device to recognize the photograph device configuration and then switch the contents of the processing to detect an image orientation according to the photograph device configuration.

Detailed examples of embodiments of the disclosed technology will be described hereinbelow with reference to the drawings.

First Embodiment

Figure 1:
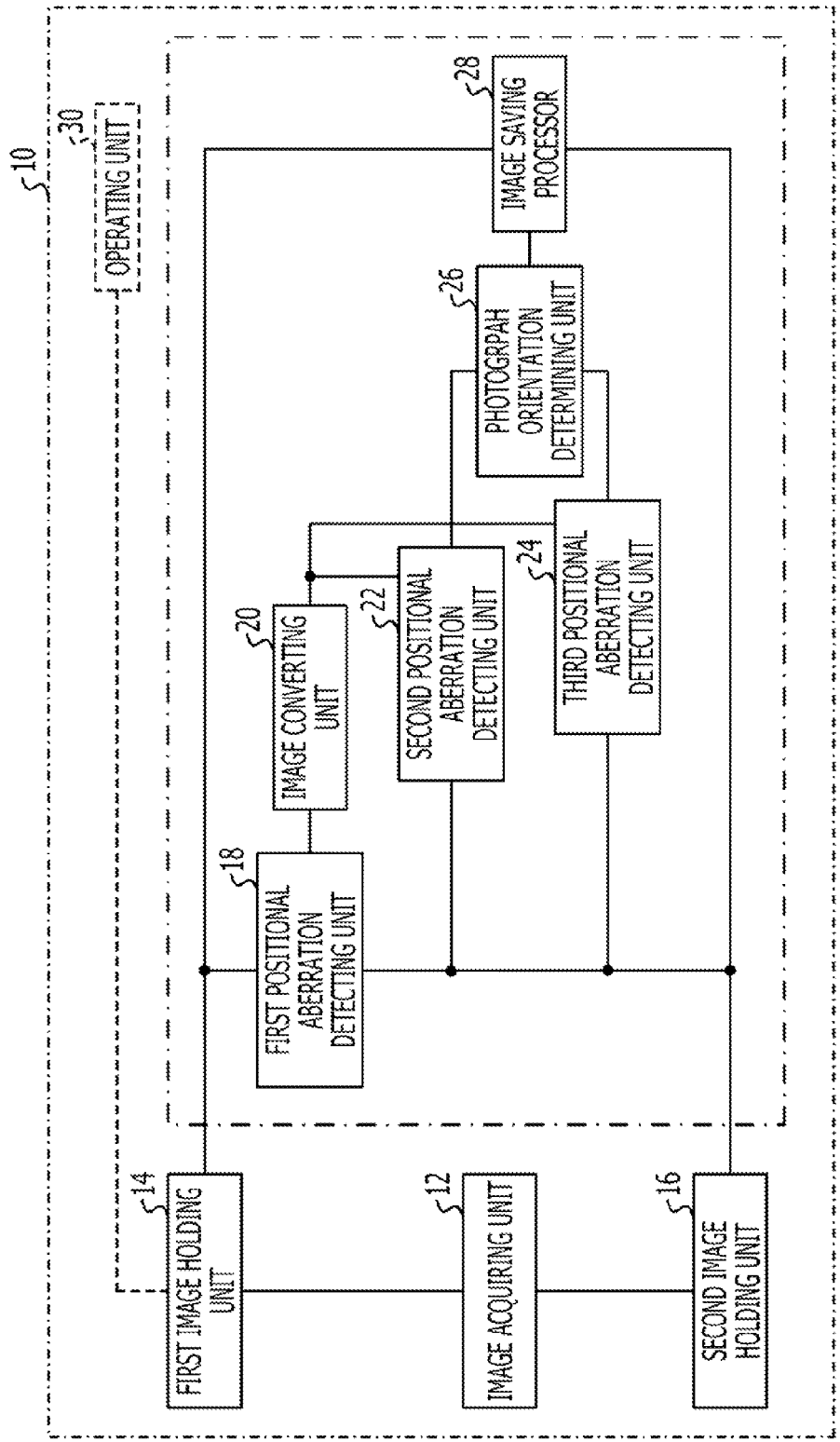
FIG. 1 is a schematic block diagram of a stereoscopic image acquiring device described in the embodiment.

FIG. 1 illustrates a stereoscopic image acquiring device 10 according to the present embodiment. The stereoscopic image acquiring device 10 is equipped with an image acquiring unit 12, a first image holding unit 14, a second image holding unit 16, a first positional aberration detecting unit 18, an image converting unit 20, a second positional aberration detecting unit 22, a third positional aberration detecting unit 24, a photograph orientation determining unit 26, and an image saving processor 28. The functional units of the stereoscopic image acquiring device 10, for example, may be implemented by an electronic circuit and the like. The stereoscopic image acquiring device, for example, may be implemented by a semiconductor integrated circuit, more specifically, an application specific integrated circuit (ASIC) and the like. Moreover, the stereoscopic image acquiring device 10 is equipped with an operating unit 30 that is an input device that receives operations inputted by a user.

Figure 2A:
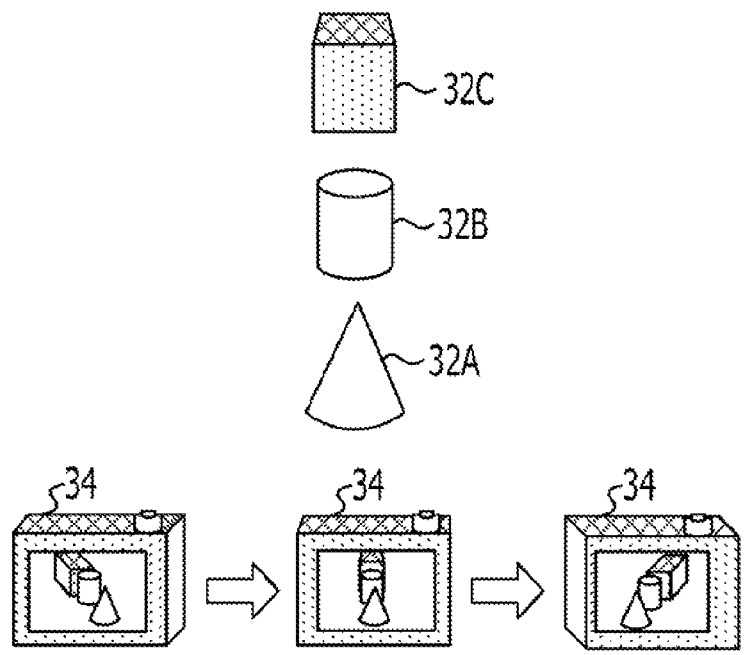
FIG. 2A illustrates examples of changes in photographic images according to movement of a shooting position in a landscape photograph.
Figure 2B:
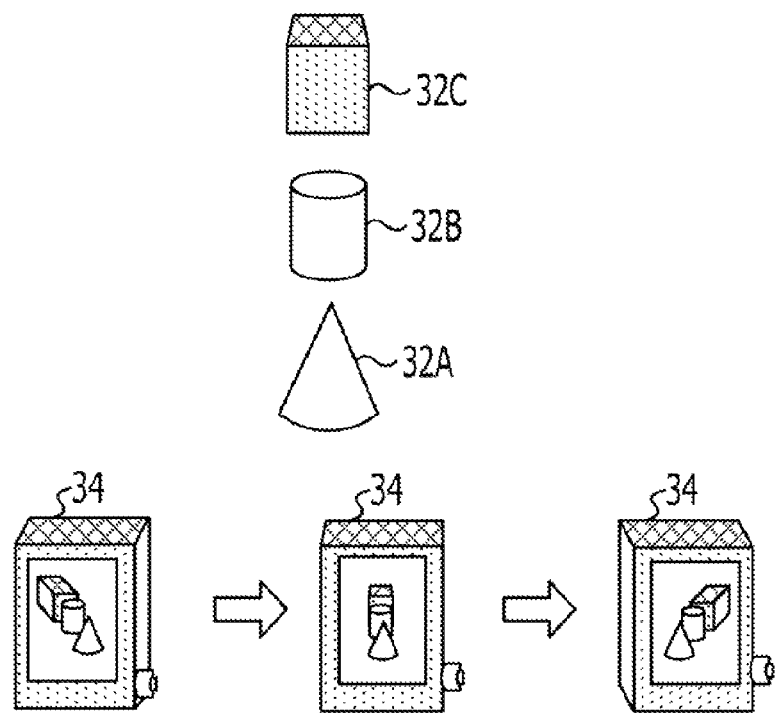
FIG. 2B illustrates examples of changes in photographic images according to movement of a shooting position in a portrait photograph.

The image acquiring unit 12 acquires image data corresponding to temporally and continuously consecutive multiple images in order. The image acquiring unit 12 may be, for example, an imaging unit that includes a Charge Coupled Device (CCD) or a Complementary Metal Oxide Semiconductor (CMOS) image sensor and the like. As an example of the image acquiring unit 12 representing the abovementioned imaging unit, the stereoscopic image acquiring device 10 according to the present embodiment may, for example, be installed inside an electronic device (e.g., a photograph device (an example of which is illustrated in FIGS. 2A and 2B) or mobile terminal, etc.) provided with the abovementioned imaging unit. Additionally, the image acquiring unit 12 may be a communication unit that acquires image data through communication from an externally provided imaging unit, or from an external information processor apparatus equipped with a memory unit that records image data. When the image acquiring unit 12 is the abovementioned communication unit, the stereoscopic image acquiring device 10 according to the present embodiment may be, for example, installed inside an electronic device (e.g., a server or a computer such as a personal computer (PC) and the like) provided with the abovementioned communication unit.

The first image holding unit 14 and the second image holding unit 16 are processing units that hold image data acquired by the image acquiring unit 12. The first image holding unit 14 holds initial image data (first image data) acquired by the image acquiring unit 12. Herein, initial image data may be image data outputted first from the image acquiring unit 12. Conversely, in another aspect, the initial image data may be image data outputted first by the image acquiring unit 12 after the operating unit 30 provided in the stereoscopic image acquiring device 10 is operated. The second image holding unit 16 holds the newest image data (second image data) acquired by the image acquiring unit 12. Therefore, the image data held by the second image holding unit 16 is updated each time new image data is acquired by the image acquiring unit 12.

The first positional aberration detecting unit 18 compares the first image data held by the first image holding unit 14 with the second image data held by the second image holding unit 16. The first positional aberration detecting unit 18 then detects positional aberrations between a background region in a first image and one in a second image. data. When foreground information that represents foreground regions in these images is set by the below-mentioned second positional aberration detecting unit 22 and the third positional aberration detecting unit 24, the first positional aberration detecting unit 18 recognizes background regions excluded from the foreground regions in the images.

The image converting unit 20 creates, from the first image, a converted image in which the positional aberration of the background region in the first image is corrected using the background region position in the second image as a reference, according to the positional aberrations of the background regions detected by the first positional aberration detecting unit 18. The second positional aberration detecting unit 22 compares the converted image created by the image converting unit 20, with the second image represented by the second image data held in the second image holding unit 16, and detects positional aberration in a first direction (e.g., the image longitudinal direction) of the foreground regions in both images. The third positional aberration detecting unit 24 compares the converted image created by the image converting unit 20, with the second image represented by the second image data held in the second image holding unit 16, and detects positional aberration in a direction perpendicular to the first direction of the foreground regions in both images.

The photograph orientation determining unit 26 determines whether or not the first and second images meet conditions for a stereoscopic image based on an amount of positional aberration in the horizontal and vertical directions detected respectively by the second positional aberration detecting unit 22 and the third positional aberration detecting unit 24. When it is determined that the stereoscopic image conditions are met, the photograph orientation determining unit 26 determines whether photograph orientation of the first and second images are lateral (landscape photograph) or vertical (portrait photograph).

The image saving processor 28 saves the first image and the second image held respectively in the first image holding unit 14 and the second image holding unit 16 when it is determined by the photograph orientation determining unit 26 that the first image and the second image meet the conditions for a stereoscopic image. The image data held in the second image holding unit 16 up to the time it is determined that the first image and the second image meet the conditions for a stereoscopic image, is updated each time new image data is acquired by the image acquiring unit 12. Moreover, when it is determined that the first and second images meet the conditions for a stereoscopic image, the image saving processor 28 saves the first image data held in the first image holding unit 14 and the second image data held in the second image holding unit 16 for creating a stereoscopic image. The image saving processor 28 additionally adds information representing the photograph orientation determined by the photograph orientation determining unit 26 to the saved first and second image data as attribute information.

Next, a stereoscopic image will be explained followed by an explanation of the operations of the present embodiment. FIGS. 2A and 2B illustrate photograph subjects which include a conical object 32A, a cylindrical object 32B, and a cubic object 32C arranged respectively in order from the closest to the farthest from the photograph device 34. The subjects are captured multiple times in shooting positions moving in the horizontal direction by the photograph device 34 equipped with a monocular imaging unit. As illustrated in FIGS. 2A and 2B, the positions in the photographic images of the objects also move along with the movement of the shooting positions (however, in the examples in FIGS. 2A and 2B, the photograph optical axis is adjusted in each photograph so that the object 32B is positioned near the center of the photographic image). If the photograph optical axis direction is not adjusted, the amount of movement of the positions in the photographic image of the image area corresponding to the objects in relation to the amount of movement of the photograph position becomes smaller in case that the photograph position distance to the objects becomes larger. This phenomenon is called "depth cue."

When the photograph device 34 equipped with a single imaging unit is used, shooting images to make a stereoscopic image is carried out by taking multiple photographs of images while moving the photograph position in a certain direction (usually the horizontal direction) as illustrated in FIGS. 2A and 2B. As a result, multiple images 36 and 38 are obtained as illustrated in FIGS. 3A and 3B. An image 40 illustrated in FIG. 3C is obtained by correcting the positional aberrations in the images 36 and 38, and then combining the images to match the image portion positions corresponding to the object (in this case object 32C) that is in the background region and whose distance from the shooting position is the largest among the objects in the image. In the image 40 illustrated in FIG. 3C, local positional aberrations occur in the image areas corresponding to objects 32A and 32B whose distance from the shooting position is smaller than the object 32C being used as a reference for the positional aberration correction. This local positional aberration is called a "parallax." A viewer who is viewing the stereoscopic image stereoscopically, can perceive the abovementioned depth cue from the image 40 and acquire a sense of spatial effect if the magnitude of the parallax (parallax amount) in the stereoscopic image is suitable, and if the parallax direction of the stereoscopic image corresponds to the direction in which the eyes of the viewer are arranged.

FIG. 2A is a so-called landscape photograph in which the longitudinal direction of the image orientation at the photographing is approximately horizontal. FIG. 2B is a so-called portrait photograph in which the longitudinal direction of the image orientation at the photographing is approximately vertical. When the photograph device 34 equipped with a single imaging unit is used for taking photographs of images for creating a stereoscopic image, there is an advantage in being able to select a landscape photograph or a portrait photograph by merely rotating the orientation of the photograph device 34 at the shooting instead of requiring a mechanism to rotate the imaging unit. However, since the parallax direction of the stereoscopic image desirably corresponds to the direction in which the eyes of the viewer are arranged when the stereoscopic image is viewed, it is desirably determined the image orientation at the shooting, in other words, whether the photograph is taken as a landscape photograph or a portrait photograph.

Figure 4A:
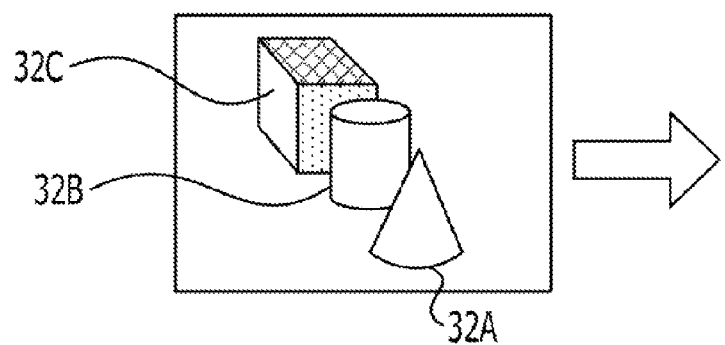
FIG. 4A illustrates an individual imaging unit moving direction in an image at the case of a landscape photograph.
Figure 4B:
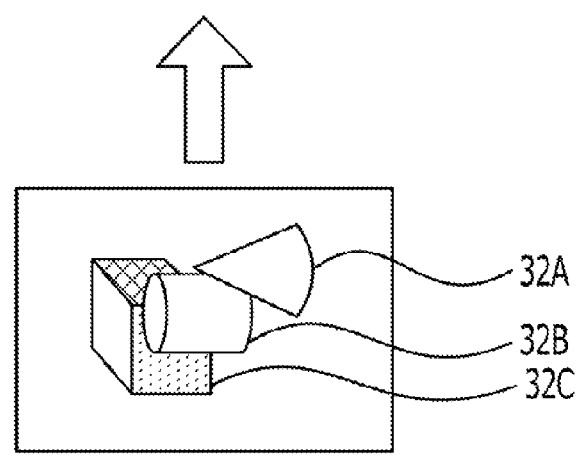
FIG. 4B illustrates an individual imaging unit moving direction in an image at the case of a portrait photograph.

When capturing images is conducted multiple times while moving the photograph position in a certain direction, the image area positions corresponding to the subjects in the image move in a direction corresponding to the moving direction of the shooting position. As a result, the image is determined to be a landscape photograph if the moving direction of the image area in the image matches the longitudinal direction of the image as illustrated with the arrow in FIG. 4A. Conversely, the image can be determined as a portrait photograph if the moving direction of the image area in the image is perpendicular to the longitudinal direction of the image as illustrated with the arrow in FIG. 4B. However, when the photograph optical axis changes to a direction perpendicular to the moving direction of the photograph position due to camera shake and the like while moving the photograph position, the position of the image area in the image also changes accordingly to the direction perpendicular to the moving direction of the photograph position. As a result, there is a possibility that the determination of the orientation at the shooting may be incorrect.

On the other hand, although changes in the photograph optical axis direction arise due to camera shake and the like, a change in the shooting position itself does not occur even when camera shake occurs. When a photograph is taken in a case where the shooting position does not change but the photograph optical axis direction does change, positional aberration of the image area corresponding to the subjects in the image occurs in the images photographed before and after the change in the photograph optical axis direction. However, both images and their foreground regions substantially match when positional aberration correction is conducted to obtain the stereoscopic image. After shooting an image 36 illustrated in FIG. 5A, the example in FIG. 5B illustrates an image 42 in which the position of the image area corresponding to the subjects in the image is caused to move vertically downward due to the photograph optical axis direction being changed in a vertically downward direction without any movement of the photograph position. When positional aberration correction of the images 36 and 42 illustrated in FIGS. 5A and 5B respectively is conducted to obtain a stereoscopic image, the images 36 and 42 and the foreground regions thereof substantially match as illustrated with an image 44 in FIG. 5C.

This is because the view of the objects from the photograph device does not change because the shooting position does not change. In other words, since parallax does not occur so long as there is no change in the shooting position, the parallax direction matches the direction of the movement of the shooting position conducted for photographing the stereoscopic image. Since the moving direction of the photograph device position is the same as the direction in which the eyes of the viewer are arranged, the image orientation at the shooting and the image orientation at the display of the stereoscopic image can then be determined. Using this fact in the present embodiment, the parallax direction of the images after conducting the positional aberration correction to obtain the stereoscopic image is detected, and thus the image orientation at the shooting and the image orientation at the display of the stereoscopic image can be determined according to the detected direction as will be explained below.

Stereoscopic image acquisition processing conducted in the stereoscopic image acquiring device 10 will be explained with reference to FIG. 6 as an operation of the present embodiment. In the stereoscopic image acquisition process illustrated in FIG. 6, image data of a single frame is first acquired by the image acquiring unit 12, and then the acquired image data is held in the first image holding unit 14 as the image data of a first image (step 50). Then image data of a subsequent single frame is acquired by the image acquiring unit 12, and then the acquired image data is held in the second image holding unit 16 as the image data of a second image (step 52).

The image data acquired by the image acquiring unit 12 in steps 50 and 52 represent one section of a series of image data acquired by repeatedly conducting photographic operations of the subjects while moving the shooting position in a horizontal position using the photograph device equipped with the monocular imaging unit. The above photographic operations may accompany operations to adjust the photograph optical axis direction such that the subjects are positioned near the middle of the image while the shooting position is being moved in the horizontal direction.

In step 54, positional aberration detection processing in the background regions is conducted by the first positional aberration detecting unit 18. This processing, which will be described in detail below, involves detecting the positional aberrations of the background regions between the first image of the image data held in the first image holding unit 14 and the second image of the image data held in the second image holding unit 16, and then calculating the amount of correction to correct the detected positional aberration. In step 56, the image converting unit 20 creates a positional aberration corrected image corrected according to the abovementioned correction amount of the first image, based on the corrected amount which is calculated in the background region positional aberration detection processing.

A corrected image in which the positional aberration of the first image is corrected using the second image as reference, is created in this processing. As a result, movement in a direction other than the parallax direction due to camera shake and the like can be excluded.

In step 58, foreground region positional aberration detection processing is conducted by both the second positional aberration detecting unit 22 and the third positional aberration detecting unit 24. In this foreground region positional aberration detection processing, the second positional aberration detecting unit 22 detects an amount of positional aberration in a first direction of the foreground region between the second image and the positional aberration corrected image created by the image converting unit 20. Moreover, the third positional aberration detecting unit 24 detects the amount of positional aberration in a second direction of the positional aberration corrected image and the second image. The foreground region positional aberration detection processing is described in detail below.

In step 60, the photograph orientation determining unit 26 determines whether or not at least one of the amounts of foreground region positional aberration detected by the second positional aberration detecting unit 22 and the third positional aberration detecting unit 24 equals or exceeds a predetermined threshold. A detailed example of the threshold used for the above determination will be described below. The amount of positional aberration of the foreground region is equivalent to a stereoscopic image parallax amount and thus a value that allows the determination of whether or not the amount of foreground region positional aberration is a suitable value for the stereoscopic image parallax amount, is set as the above threshold. If the determination in step 60 is negative, the processing returns to step 52 and then steps 52 to 60 are repeated until the determination in step 60 is positive. As a result, the acquisition of image data by the image acquiring unit 12 and the updating (updating of the second image) of the image data held in the second image holding unit 16 is repeated until the foreground region positional aberration amount equals or exceeds the threshold.

When the foreground region positional aberration amount equals or exceeds the threshold, the determination in step 60 is positive and the processing advances to step 62 where the photograph orientation determining unit 26 conducts image orientation determination processing to determine the image orientation at the shooting based on the foreground region positional aberration amount. The image orientation determination processing is described in detail below. In step 64, the image saving processor 28 then reads the image data of the first image from the first image holding unit 14 and the image data of the second image from the second image holding unit 16. The image saving processor 28 also creates orientation information that represents the image orientation determined in the image orientation determination processing. Next, the created orientation information is added as attribute information to the stereoscopic image data that includes the read image data of the first image and the read image data of the second image. The stereoscopic image data to which the orientation information is added as attribute information is saved, and then the processing is completed.

The image orientation information added to the stereoscopic image data as attribute information is referenced at the display of the stereoscopic image represented by the stereoscopic image data. The stereoscopic image is rotated as necessary to make the parallax direction of the stereoscopic image correspond to the direction in which the eyes of the viewer are arranged, and then the stereoscopic image is displayed.

Figure 7:
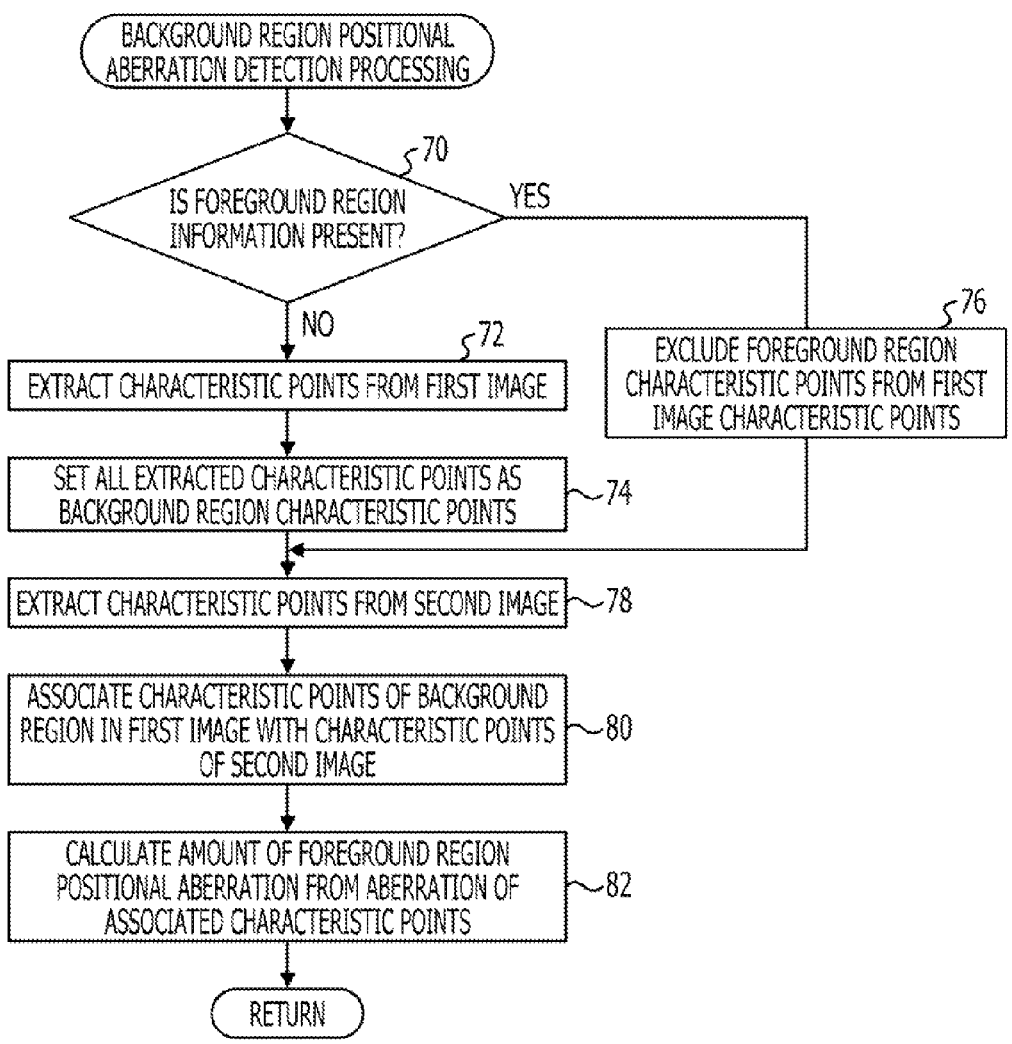
FIG. 7 is a flow chart illustrating background region positional aberration detection processing.

Next, the background region positional aberration detection processing conducted in step 54 in the stereoscopic image acquisition process (FIG. 6) will be described with reference to FIG. 7. The first positional aberration detecting unit 18 first determines in step 70 of the background region positional aberration detection processing whether or not foreground region information is set. The foreground region information is information that prescribes positions and a range of the foreground region in an image. The foreground region information is set according to second positional aberration detection processing described below. Therefore, the foreground region information is not set when the background region positional aberration detection processing is initially conducted. The foreground region information is set by conducting the second positional aberration detection processing during or after the second time the background region positional aberration detection processing is conducted.

When the determination in step 70 is negative because the foreground region information is not set, the first positional aberration detecting unit 18 extracts characteristic points from all regions of the first image (step 72) and sets all the extracted characteristic points as background region characteristic points in the first image (step 74). Conversely, when the determination in step 70 is positive because the foreground region information is set, the first positional aberration detecting unit 18 removes the characteristic points present inside the foreground region indicated by the foreground region information from the background region characteristic points among the characteristic points set as first image background region characteristic points (step 76).

The processing in steps 70 and 76 is not required. These functions may be treated as additional functions to lessen the processing load.

Next, the first positional aberration detecting unit 18 extracts the characteristic points from the second image (step 78), and conducts processing to associate the first image background region characteristic points with the characteristic points extracted from the second image (step 80). The association of the characteristic points may be conducted by a concrete approach that uses, for example, a plane projective transformation method, or more specifically, Hartley's 8-point algorithm or another algorithm. The first positional aberration detecting unit 18 then calculates a correction amount for correcting the background region positional aberration based on the positional aberration of the associated characteristic points of the first and second images (step 82). The background region positional aberration detection processing is then completed.

Figure 8:
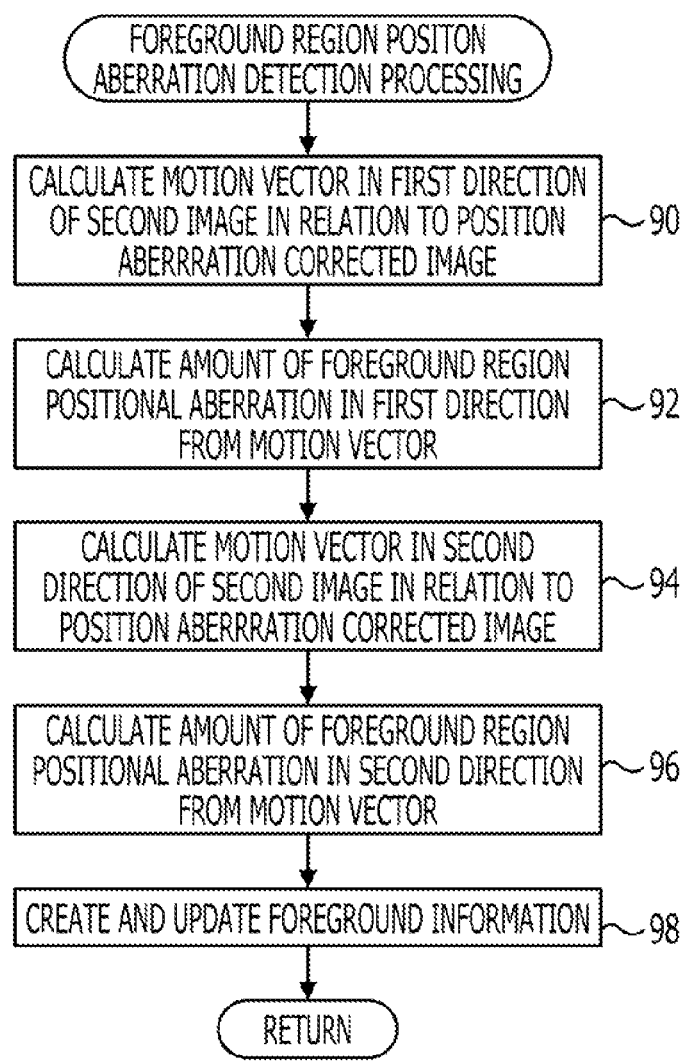
FIG. 8 is a flow chart illustrating foreground region positional aberration detection processing.

Next, the foreground region positional aberration detection processing conducted in step 58 in the stereoscopic image acquisition process (FIG. 6) will be described with reference to FIG. 8. In step 90, the second positional aberration detecting unit 22 calculates a motion vector in a first direction (e.g., the image longitudinal direction) of the second image in relation to the positional aberration corrected image created by the image converting unit 20. Since the positional aberration corrected image is created by correcting the positional aberration of the background region of the second image the motion vector calculated above corresponds to the amount of foreground region positional aberration between the positional aberration corrected image and the second image in the first direction.

In step 92, the second positional aberration detecting unit 22 first searches for the previously calculated motion vector in the first direction, as units of individual blocks that are derived by dividing the image into multiple blocks (partial regions). The modulation of the motion vector is larger than zero of the blocks in which positional aberration between the positional aberration corrected image and the second image is generated, and also increases according to the positional aberration amount between the positional aberration corrected image and the second image increases. The second positional aberration detecting unit 22 calculates a modulation of the motion vector (e.g., the maximum value) in the first direction for each block whose the modulation of the motion vector in the first direction is greater than 0, and it is considered as the foreground region positional aberration amount in the first direction.

Further in step 94, the third positional aberration detecting unit 24 calculates the motion vector in a second direction (e.g., a direction perpendicular to the image longitudinal direction) of the second image in relation to the positional aberration corrected image. The motion vector calculated above is the equivalent of the amount of foreground region positional aberration in the second direction between the positional aberration corrected image and the second image.

In step 96, the third positional aberration detecting unit 24 first searches for the previously calculated motion vector in the second direction, and it is considered as units of individual blocks by dividing the image into multiple blocks (partial regions). Then the third positional aberration detecting unit 24 calculates a motion vector value (e.g., the maximum value) in the second direction for each block whose motion vector value in the second direction is greater than 0, and it is considered as the foreground region positional aberration amount in the second direction.

In step 98, if the foreground region information is not set yet, the second positional aberration detecting unit 22 and the third positional aberration detecting unit 24 set the foreground region information so that the blocks having a calculated amount of foreground region positional aberration exceeding the previously established threshold are included in the foreground region. The second positional aberration detecting unit 22 and the third positional aberration detecting unit 24 also update the foreground region information so that the blocks whose foreground region positional aberration amount newly exceeds the threshold are added to the foreground region if the foreground region information has been previously set. The foreground region positional aberration detection processing is then completed.

Next, the image orientation determination processing conducted by the photograph orientation determining unit 26 in step 62 of the stereoscopic image acquisition process (FIG. 6) will be described in detail. Generally, landscape photographing or portrait photographing is previously set as a standard image orientation at the shooting in a photograph device used for photographing objects. When image data acquired by the image acquiring unit 12 is image data of images photographed with a photograph device whose standard image orientation at the shooting is a landscape photograph, the processing illustrated in FIG. 9A is conducted as image orientation determination processing.

Figure 9A:
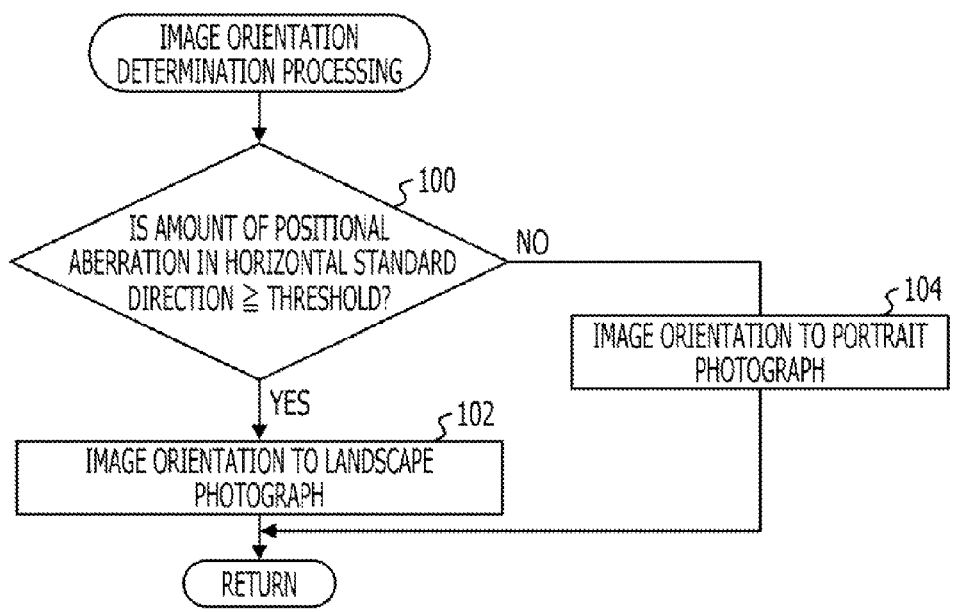
FIG. 9A is a flow chart illustrating image orientation determination processing based on a landscape photograph reference.

The photograph orientation determining unit 26 determines, in step 100 of the image orientation determination processing illustrated in FIG. 9A, whether or not the amount of positional aberration in the horizontal standard direction is equal to or greater than the previously set threshold. The abovementioned horizontal standard direction is a direction of the image that corresponds to the horizontal direction of the subjects in the image photographed in the standard image orientation at the shooting; and when the standard image orientation during photographing is a landscape photograph, the horizontal standard direction is the image longitudinal direction. The photograph orientation determining unit 26 conducts the above determination in step 100 by comparing the threshold with the amount of foreground region positional aberration in the image longitudinal direction detected by the second positional aberration detecting unit 22 and the third positional aberration detecting unit 24. A threshold that is the same as the threshold used for determination in step 60 in the stereoscopic image acquisition process (FIG. 6) can be used as the above threshold.

When the determination in step 100 is positive, the parallax direction is determined to match the image longitudinal direction that is the horizontal standard direction. As a result, when the determination in step 100 is positive (step 102), the photograph orientation determining unit 26 sets the information to indicate "landscape photograph" in the orientation information that represents the image orientation at the shooting. In this case, the stereoscopic image is displayed such that the orientation is in the image horizontal direction indicating the image longitudinal direction based on the above orientation information. When the determination in step 100 is negative, the parallax direction is determined to be matching the direction perpendicular to the image longitudinal direction that is the horizontal standard direction. As a result, when the determination in step 100 is negative (step 104), the photograph orientation determining unit 26 sets the information to indicate "portrait photograph" in the orientation information that represents the image orientation at the shooting. In this case, the stereoscopic image is displayed such that the orientation is in the image horizontal direction indicating the direction perpendicular to the image longitudinal direction based on the above orientation information. Then the image orientation determination processing illustrated in FIG. 9A is completed.

Figure 9B:
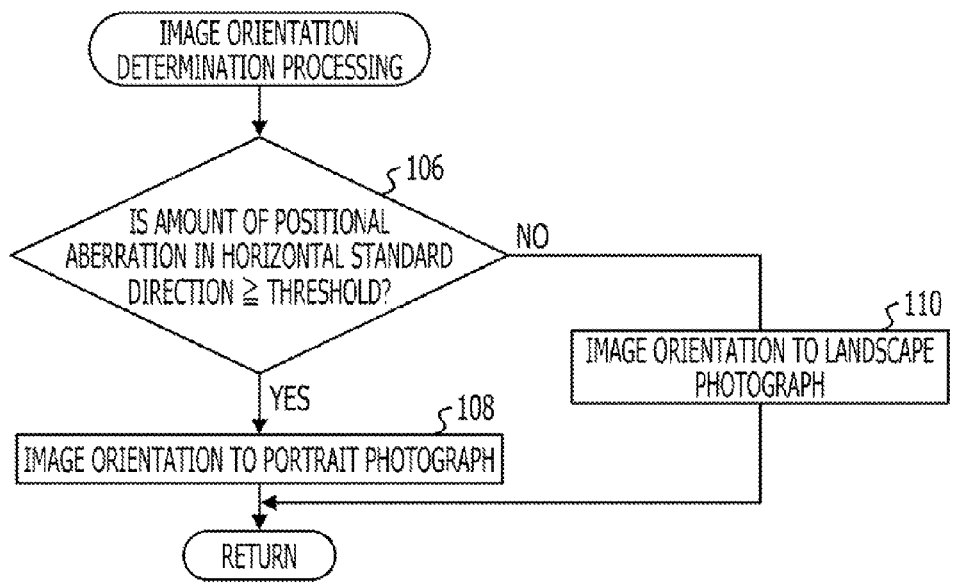
FIG. 9B is a flow chart illustrating image orientation determination processing based on a portrait photograph reference.

Conversely, when image data acquired by the image acquiring unit 12 photographed with a photograph device whose standard image orientation at the shooting is a portrait photograph, the processing illustrated in FIG. 9B is conducted as image orientation determination processing. The photograph orientation determining unit 26 determines, in step 106 of the image orientation determination processing illustrated in FIG. 9B, whether or not the amount of positional aberration in the horizontal standard direction is equal to or greater than a previously set threshold. When the default image orientation at the shooting is a portrait photograph, the above horizontal default direction is perpendicular to the image longitudinal direction. The photograph orientation determining unit 26 conducts the above determination in step 106 by comparing the threshold with the amount of foreground region positional aberration in the direction perpendicular to the image longitudinal direction detected by the second positional aberration detecting unit 22 and the third positional aberration detecting unit 24. A threshold that is the same as the threshold used for determination in step 60 in the stereoscopic image acquisition process (FIG. 6) can be used as the above threshold.

When the determination in step 106 is positive, the parallax direction is determined to be matching the direction perpendicular to the image longitudinal direction that is the horizontal standard direction. As a result, when the determination in step 106 is positive (step 108), the photograph orientation determining unit 26 sets the information to indicate "portrait photograph" in the orientation information that represents the image orientation at the shooting. In this case, the stereoscopic image is displayed such that the orientation is in the image horizontal direction indicating the direction perpendicular to the image longitudinal direction based on the above orientation information. When the determination in step 106 is negative, the parallax direction is determined to be matching the image longitudinal direction. As a result, when the determination in step 106 is negative (step 110), the photograph orientation determining unit 26 sets the information to indicate "landscape photograph" in the orientation information that represents the image orientation at the shooting. In this case, the stereoscopic image is displayed such that the orientation is in the image horizontal direction indicating the image longitudinal direction based on the above orientation information. Then the image orientation determination processing illustrated in FIG. 9B is completed.

Next, a specific example of the threshold used in the determinations in step 60 in the stereoscopic image acquisition process (FIG. 6), in step 100 of the image orientation determination processing in FIG. 9A, and in step 106 of the image orientation determination processing in FIG. 9B will be described. This threshold is a default value indicating whether the foreground region positional aberration amount value is suitable as a stereoscopic image parallax amount. The threshold has a lower limit and an upper limit to allow for a suitable range in which the viewer can perceive a spatial effect from the stereoscopic image and yet allow for a range in which an extreme level of projection of the objects in the stereoscopic image from the screen is suppressed.

Human eyes exhibit parallel vision, that is, the vision of a viewing object with an interocular distance parallax is infinite, but vision cannot be conducted when the eyes are outside of parallelism. As a result, in a stereoscopic image in which the parallax amount in the background region exceeds the average interocular distance of a human, left and right images cannot be fused into a single image in the brain and the stereoscopic image cannot be appreciated (recognized) as a stereoscopic image. Therefore, the lower limit of the threshold for the foreground region positional aberration amount is set such that the parallax amount in the background region of the stereoscopic image does not exceed the interocular distance. As an example, when a stereoscopic image of 2 megapixels (1920×1080 pixels) is displayed on a household television screen with a maximum screen size of 60 inches (about 130 cm wide), since the average human interocular distance is equal to 6.5 cm, the threshold lower limit will be about 100 pixels based on the conversion of the pixel numbers on the screen being 1920×(6.5/130).

Additionally, the threshold upper limit in relation to the foreground region positional aberration amount is set such that an extreme level of projection of the objects in the stereoscopic image from the screen is suppressed. As an example, if the amount of projection from the screen by the objects in the stereoscopic image is allowed to be half of a viewing distance, in the previous example, a negative parallax of 100 pixels is added such that the threshold upper limit becomes 100+100=200 pixels with the conversion of the pixel numbers on the screen.

More specifically, the abovementioned determinations may involve comparisons of the upper and lower limits of the thresholds with the foreground region positional aberration amounts. If the foreground region positional aberration amounts are not more than the threshold upper limits and not less than the threshold lower limits, the determinations may be considered positive. Furthermore, when a value (e.g., a mean value of the upper limit and the lower limit) between the threshold upper and lower limits is compared with the foreground region positional aberration amounts, the determinations may be considered positive if the foreground region positional aberration amounts are equal to or more than the compared value.

Second Embodiment

The following is an explanation of a second embodiment of the disclosed invention. The structure of the second embodiment is substantially similar to the abovementioned first embodiment. Similar elements are provided with the same reference numerals and explanations thereof will be omitted, and only the parts that are different from the first embodiment will be explained below.

Figure 10:
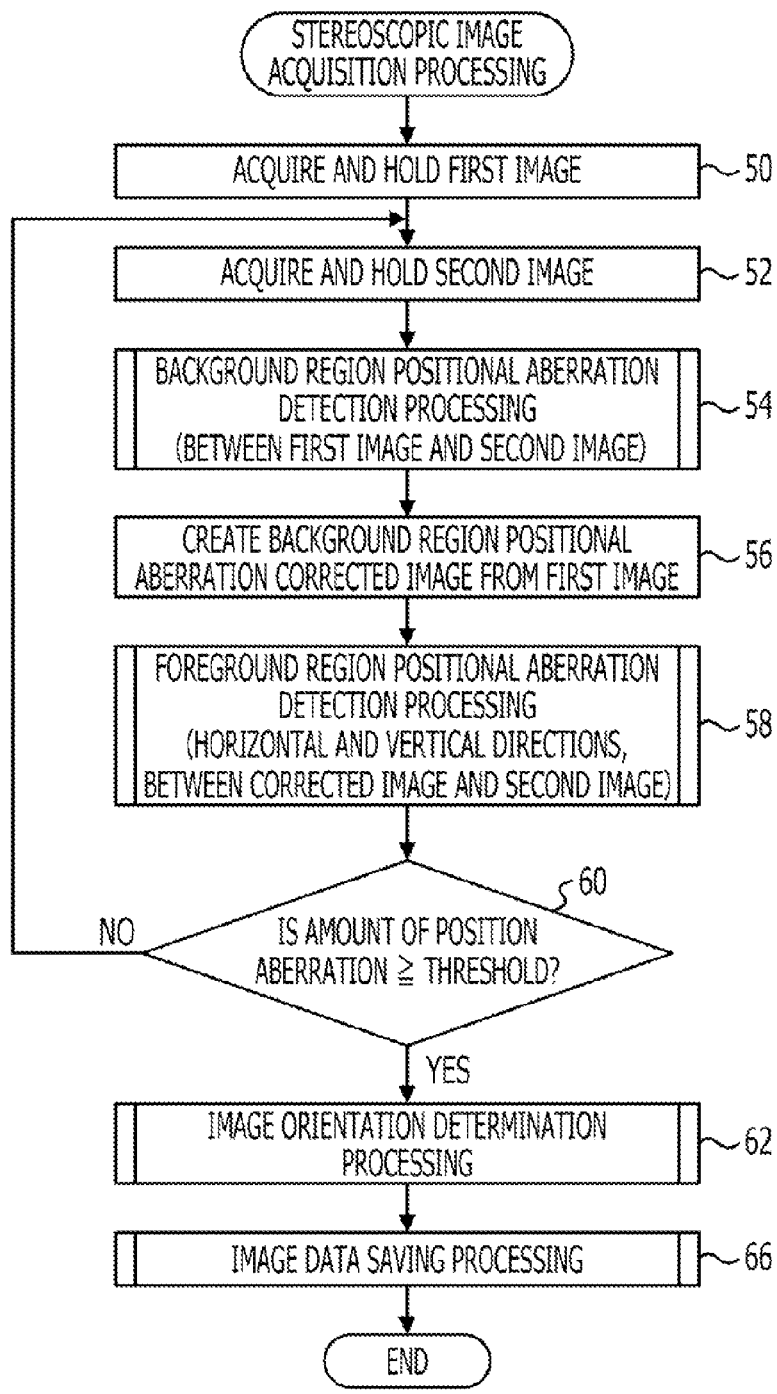
FIG. 10 is a flow chart illustrating stereoscopic image acquiring processing according to a second embodiment.

In the second embodiment, a stereoscopic image acquisition process illustrated in FIG. 10 is conducted by the stereoscopic image acquiring device 10. The stereoscopic image acquisition process according to the second embodiment includes image data saving processing by the image saving processor 28 in step 66 after the image orientation determination processing is conducted by the photograph orientation determining unit 26 in step 62. When image data acquired by the image acquiring unit 12 is shot with a photograph device whose standard image orientation at the shooting is a landscape photograph, the processing illustrated in FIG. 11A is conducted by the image saving processor 28 as image data saving processing.

Figure 11A:
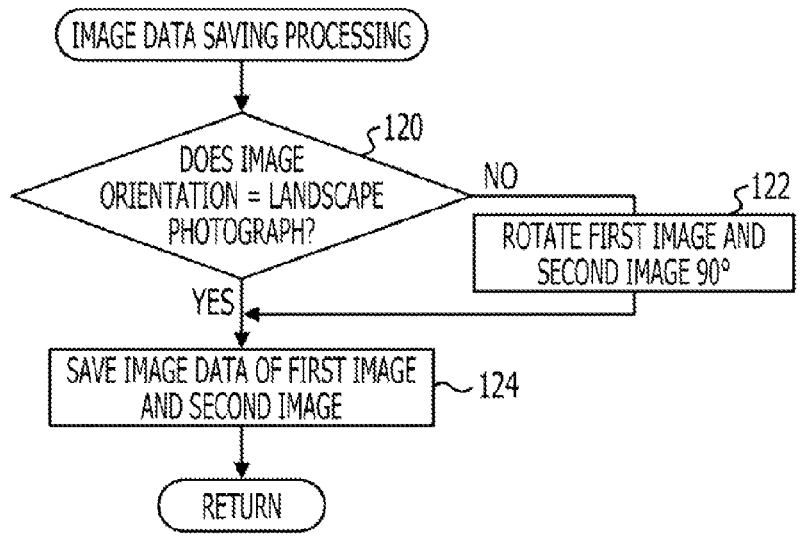
FIG. 11A is a flow chart illustrating image data saving processing based on a landscape photograph reference.

Specifically, the image saving processor 28 determines whether the image orientation at the shooting determined by the photograph orientation determining unit 26 is a landscape photograph in step 120 of the image data saving processing illustrated in FIG. 11A. The processing advances to step 124 when the image orientation at the shooting is determined to be a landscape photograph. When the image orientation at the shooting is determined to not be a landscape photograph (i.e., a portrait photograph), the image saving processor 28 reads the image data of the first image from the first image holding unit 14 and reads the image data of the second image from the second image holding unit 16 in step 122. The image saving processor 28 then converts the read image data to image data that represents an image of the read image data rotated by 90 degrees, and the processing advances to step 124.

The image saving processor 28 saves the stereoscopic image data including the image data of the first image and the image data of the second image in step 124, and then the processing is terminated. In the above processing, when the image orientation at the shooting is different from the standard image orientation at the shooting, the image data representing the image rotated by 90 degrees is saved as stereoscopic image data. Therefore, at the display of the stereoscopic image represented by the saved stereoscopic image data, the image longitudinal direction that is the horizontal standard direction in the case where the standard image orientation at the shooting is a landscape photograph can be displayed uniformly to correspond to the direction in which the eyes of the viewer are arranged (the horizontal direction of the displayed image). As a result, the stereoscopic image can be displayed such that the parallax direction of the stereoscopic image matches the direction in which the eyes of the viewer are arranged without processing to rotate the stereoscopic image to be displayed corresponding to the image orientation at the shooting.

Figure 11B:
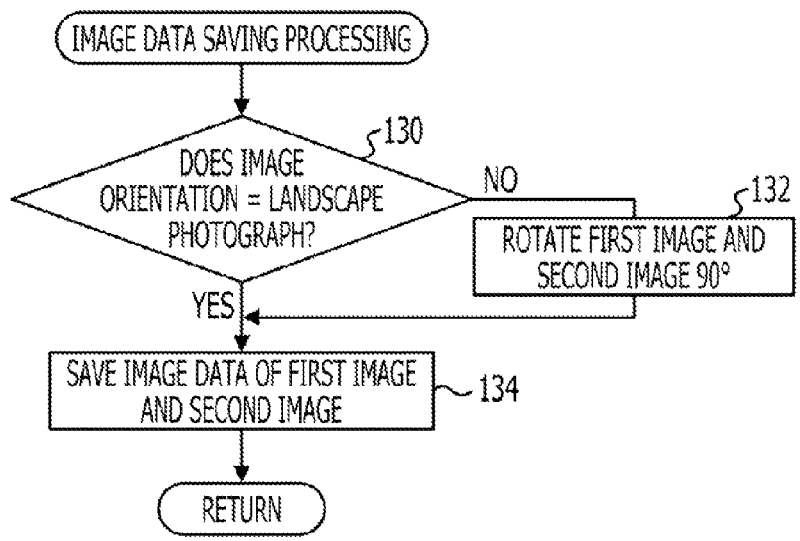
FIG. 11B is a flow chart illustrating image data saving processing based on a portrait photograph reference.

Further, when image data acquired by the image acquiring unit 12 is shot with a photograph device whose standard image orientation at the shooting is a portrait photograph, the processing illustrated in FIG. 11B is conducted by the image saving processor 28 as image data saving processing. In step 130 of the image data saving processing illustrated in FIG. 11B, the image saving processor 28 determines whether the image orientation at the shooting determined by the photograph orientation determining unit 26 is a portrait photograph. The processing advances to step 134 when the image orientation at the shooting is determined to be a portrait photograph. When the image orientation at the shooting is determined to not be a portrait photograph (i.e., a landscape photograph), the image saving processor 28 reads the image data of the first image from the first image holding unit 14 and reads the image data of the second image from the second image holding unit 16 in step 132. The image saving processor 28 then converts the read image data to image data that represents an image of the read image data rotated by 90 degrees, and the processing advances to step 134.

The image saving processor 28 saves the stereoscopic image data including the image data of the first image and the image data of the second image in step 134, and then the processing is terminated. In the above processing, when the image orientation at the shooting is different from the default image orientation at the shooting, the image data representing the image rotated by 90 degrees is saved as stereoscopic image data. Therefore, at the display of the stereoscopic image represented by the saved stereoscopic image data is displayed, the direction perpendicular to the image longitudinal direction that is the default horizontal direction in the case where the default image orientation at the shooting is a landscape photograph can be displayed uniformly to correspond to the direction in which the eyes of the viewer are arranged. As a result, the stereoscopic image can be displayed such that the parallax direction of the stereoscopic image matches the direction in which the eyes of the viewer are arranged without processing to rotate the stereoscopic image to be displayed corresponding to the image orientation at the shooting.

The above first and second embodiments describe an example of the image saving processor 28 saving images in the first image holding unit 14 and the second image holding unit 16. In an embodiment different from the above embodiments, in place of the first image in which the image saved by the image saving processor 28 is held in the first image holding unit 14, a corrected image in which the positional aberration of the first image is converted by the image converting unit 20 is saved. By using a corrected image as an object for saving, there is no need to correct camera shake in a direction different from the parallax when the images are displayed.

Third Embodiment

The following is an explanation of a third embodiment of the disclosed invention. FIG. 12 illustrates a computer 140 that can function as the stereoscopic image acquiring device 10.

The computer 140 includes a CPU 142, a memory 144, and a non-volatile storage unit 146, all of which are interconnected by a bus 148. The storage unit 146 may be achieved by a hard disk drive (HDD) or a flash memory device, for example. A stereoscopic image acquisition program 150 for causing the computer 140 to function as the stereoscopic image acquiring device 10 is recorded in the storage unit 146 acting as a recording medium. The CPU 142 reads the stereoscopic image acquisition program 150 from the storage unit 146 and expands the stereoscopic image acquisition program 150 in the memory 144 to conduct the processes in the stereoscopic image acquisition program 150 in order.

The stereoscopic image acquisition program 150 has an image acquisition process 152, a first image holding process 154, a second image holding process 156, a first positional aberration detection process 158, and an image converting process 160. The stereoscopic image acquisition program 150 also has a second positional aberration detection process 162, a third positional aberration detection process 164, a photograph orientation determination process 166, and an image saving process 168.

The CPU 142 conducts operations substantially similar to the image acquiring unit 12 illustrated in FIG. 1 by executing the image acquisition process 152. Specifically, the image acquisition process 152 executes a process to acquire in order image data of multiple images through communication with an external device connected to the computer 140 through a communication line. The external device may be a photograph device or an external information processor apparatus equipped with a storage unit to store image data.

The CPU 142 conducts operations similar to the first image holding unit 14 illustrated in FIG. 1 by executing the first image holding process 154. Specifically, the first image holding process 154 executes a process to hold the image data acquired in the image acquisition process 152.

The CPU 142 conducts operations similar to the second image holding unit 16 illustrated in FIG. 1 by executing the second image holding process 156. Specifically, the second image holding process 156 executes a process to hold the image data acquired in the image acquisition process 152.

The CPU 142 conducts operations similar to the first positional aberration detecting unit 18 illustrated in FIG. 1 by executing the first positional aberration detection process 158. Specifically, the first positional aberration detection process 158 executes a process to detect positional aberration between the background region in the first image and the background region in the second image The CPU 142 conducts operations similar to the image converting unit 20 illustrated in FIG. 1 by executing the image converting process 160. The image converting unit 20 creates from the first image a converted image in which the positional aberration of the background region in the first image is corrected using the background region position in the second image as reference, according to the positional aberration of the background region detected by the first positional aberration detecting unit 18.

The CPU 142 conducts operations similar to the second positional aberration detecting unit 22 illustrated in FIG. 1 by executing the second positional aberration detection process 162. Specifically, the second positional aberration detection process 162 executes a process to compare the converted image and the second image to detect positional aberration in the first direction of the foreground regions in both of the images.

The CPU 142 conducts operations similar to the third positional aberration detecting unit 24 illustrated in FIG. 1 by executing the third positional aberration detection process 164. Specifically, the third positional aberration detection process 164 executes a process to compare the converted image and the second image to detect positional aberration in the second direction of the foreground regions in both of the images.

The CPU 142 conducts operations substantially similar to the photograph orientation determining unit 26 illustrated in FIG. 1 by executing the photograph orientation determination process 166. Specifically, the photograph orientation determination process 166 executes a process to determine whether the first image and the second image meet the conditions of a stereoscopic image, and to determine whether the photograph orientation of the first and the second images is a landscape orientation or a portrait orientation.

The CPU 142 conducts operations substantially similar to the image saving processor 28 illustrated in FIG. 1 by executing the image saving process 168. Specifically, the image saving process 168 executes a process to save the first image data and the second image data for creating the stereoscopic image, and a process to add information representing the photograph orientation as attribute information.

In this way, the computer 140 that executes the stereoscopic image acquisition program 150 functions as the stereoscopic image acquiring device 10. Although the above describes reading the stereoscopic image acquisition program 150 from the storage unit 146, the stereoscopic image acquisition program 150 may also be read from any recording medium and then executed.

As described above, the stereoscopic image acquiring device 10 and the stereoscopic image acquisition program 150 according to the present embodiment can determine the image orientation at the shooting from among multiple photographed images without a configuration to detect the image orientation at the shooting and acquire the detection results. Moreover, the image orientation can be determined upon the display of the stereoscopic image. Further, the need to switch processing to determine the image orientation at the shooting according to the photograph device configuration used in photographing the images is made unnecessary, and the image orientation at the shooting can be determined with the same processing regardless of the photograph device configuration used in photographing the images.

Although the above explanation describes an aspect in which correction of the background region positional aberration occurs on the first image with the first image as a non-reference image and the second image as a reference image, the present invention is not limited to the above aspect. For example, the image converting unit 20 may be configured to conduct the background region positional aberration correction on the second image using the first image as the reference image and the second image as the non-reference image. In this case, the second positional aberration detecting unit 22 and the third positional aberration detecting unit 24 may be configured to detect the foreground region positional aberration between the first image and the converted image created by the image converting unit 20.

Moreover, although the above explanation describes an aspect (step 100 in FIG. 9A and step 106 in FIG. 9B) in which the image orientation is determined according to whether the amount of foreground region positional aberration in the horizontal standard direction is equal to or greater than the threshold, the present invention is not limited to this aspect. For example, in place of the above determination, the direction with the largest amount of foreground region positional aberration may be determined as the image longitudinal direction or the direction perpendicular to the image longitudinal direction. In this case, the image orientation can be determined as a landscape photograph if the amount of foreground region positional aberration in the image longitudinal direction is larger. Similarly, the image orientation can be determined as a portrait photograph if the amount of foreground region positional aberration in the direction perpendicular to the image longitudinal direction is larger.

Additionally, although the above explanation describes an aspect in which the photographer moves the photograph device position for creating a stereoscopic image as described above, the present invention is not limited to this aspect. Photographing of images for creating a stereoscopic image can be conducted without a special operation by the photographer to move the shooting position such as, for example, having the photographer sit in a vehicle (e.g., a car or the like) moving in a fixed direction to photograph objects outside of the vehicle multiple times.

Furthermore, although an example in which the photograph device 34 equipped with a single imaging unit is used to photograph images for creating a stereoscopic image, the present invention is not limited to this example. For example, a photograph device equipped with multiple imaging units may be used so that the image orientation at the shooting for creating the stereoscopic image that is photographed by any one of the multiple imaging units, and the image orientation at the display can be determined. Even when a photograph device equipped with multiple imaging units is used, there is an advantage in that photographing with any base line length is possible by photographing images for creating a stereoscopic image with any one of the multiple imaging units.

Furthermore, although an example in which the images for creating the stereoscopic image are photographed by a photograph device not having a mechanism to rotate imaging units is described above, the disclosed invention is not limited as such and determination of the image orientation at the shooting by a photograph device having a mechanism to rotate the imaging unit may be conducted. In this case, the image orientation at the display can be determined without providing a configuration to sense the image orientation at the shooting.

Figure 13:
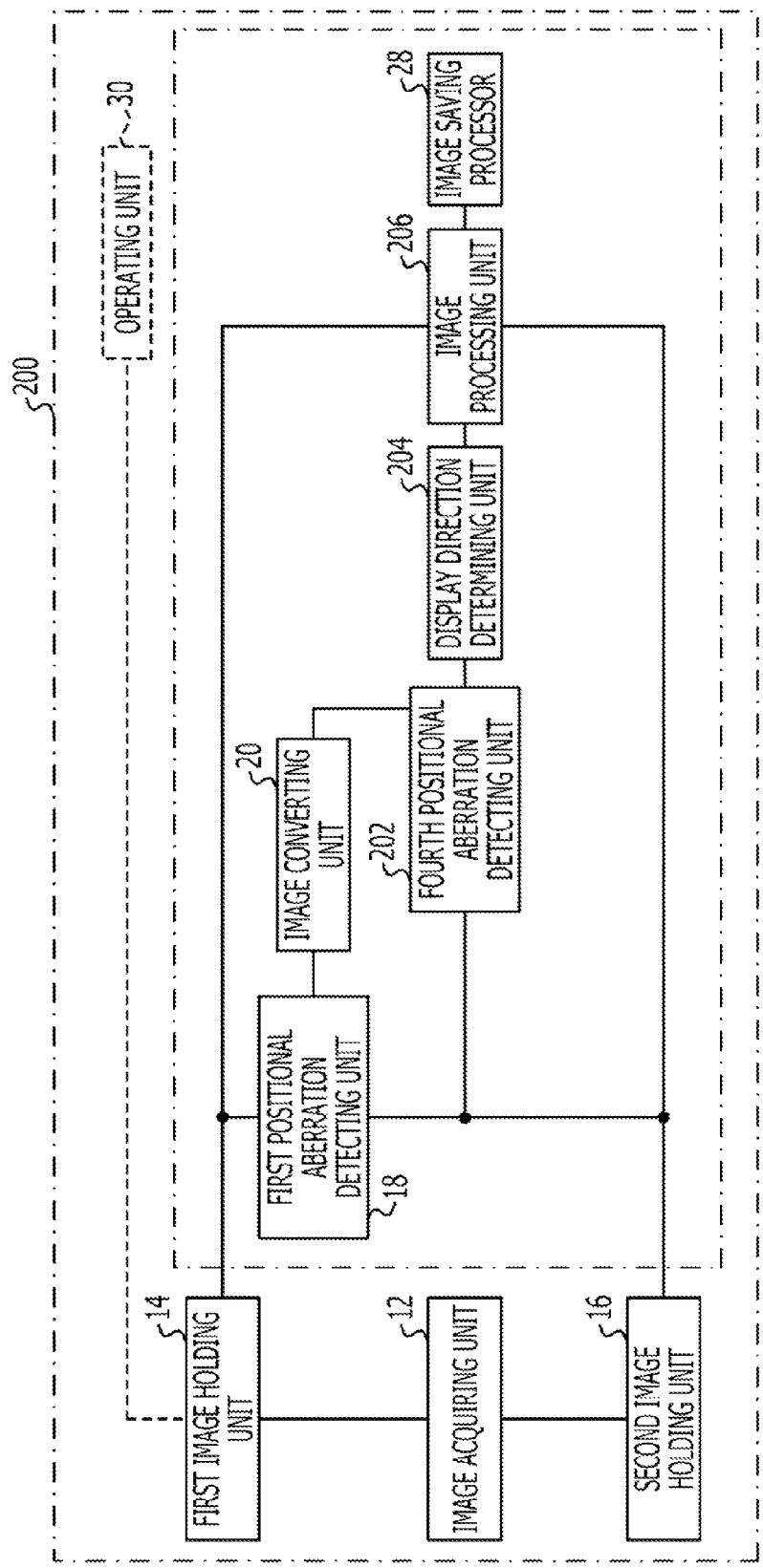
FIG. 13 is a schematic block diagram illustrating another configuration of a stereoscopic image acquiring device.

Furthermore, as described above, it is assumed that a portrait photograph or a landscape photograph can be selected as the image orientation at the shooting. That is, the image orientation at the display can be determined by determining the image orientation at the shooting. The disclosed invention is not limited to the first embodiment. FIG. 13 illustrates, as an example, a stereoscopic image acquiring device 200 according to another embodiment. In the following explanation, reference numerals that are the same as those of the stereoscopic image acquiring device 10 refer to the same parts of the stereoscopic image acquiring device 10 described in the first embodiment and explanations thereof will be omitted. Thus, only the parts that are different from the stereoscopic image acquiring device 10 described in the first embodiment will be described.

The stereoscopic image acquiring device 200 is equipped with a fourth positional aberration detecting unit 202 in place of the second positional aberration detecting unit 22 and the third positional aberration detecting unit 24. In addition, the stereoscopic image acquiring device 200 is equipped with a display direction determining unit 204 in place of the photograph orientation determining unit 26. In addition, the stereoscopic image acquiring device 200 is equipped with an image processing unit 206. Image data shot in any orientation including portrait and landscape photographs is acquired by the image acquiring unit 12 in the stereoscopic image acquiring device 200. As a result, the fourth positional aberration detecting unit 202 detects foreground region positional aberrations between the converted image created by the image converting unit 20 and the second image data held in the second image holding unit 16. Then the fourth positional aberration detecting unit 202 detects the image orientation with the largest positional aberration amount of the detected foreground region After that, the fourth positional aberration detecting unit 202 outputs the image orientation and the aberration amount.

The display direction determining unit 204 determines whether the first and second images meet the stereoscopic image conditions by determining whether or not the amount of foreground region positional aberration outputted by the fourth positional aberration detecting unit 202 is equal to or greater than the threshold. The display direction determining unit 204 then determines that the direction of the foreground region positional aberration determined to be meeting the stereoscopic image conditions since the amount of foreground region positional aberration is equal to or greater than the threshold, is the image horizontal direction at the display of the image.

The image processing unit 206 determines whether the image horizontal direction at the display of the image determined by the display direction determining unit 204 runs parallel or perpendicular to the outer borders of the converted image and the second image. When this determination is positive, the image processing unit 206 outputs the image horizontal direction at the display of the image determined by the display direction determining unit 204 as the horizontal direction.

Figure 14A:
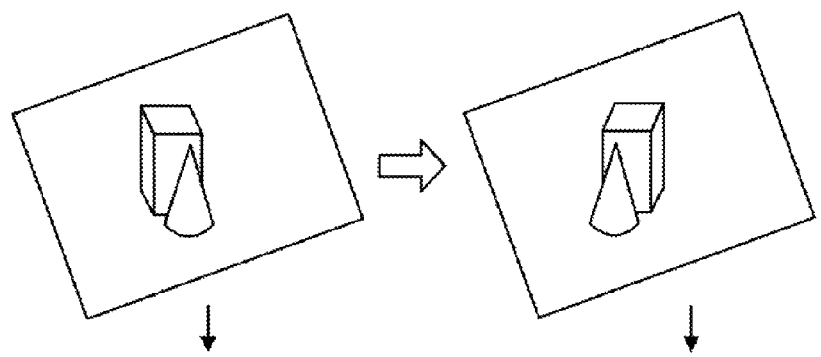
FIG. 14A illustrates examples of images at the time of shooting.
Figure 14B:
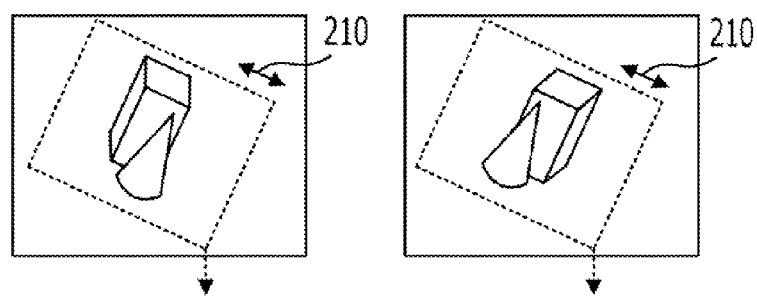
FIG. 14B illustrates examples of photographic images.
Figure 14C:
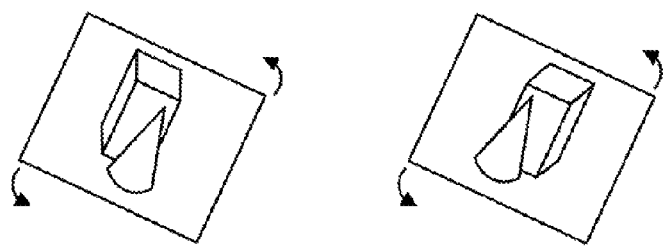
FIG. 14C illustrates examples of rectangular regions cut out from photographic images.
Figure 14D:
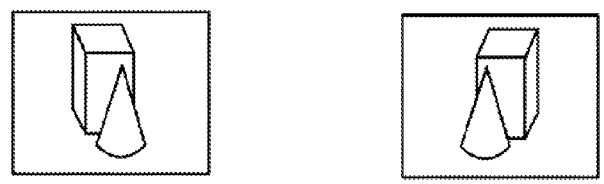
FIG. 14D illustrates examples of images (rectangular regions) subjected to rotation processing.

Conversely, as the example illustrated in FIG. 14A, when the objects are photographed in an orientation different from the portrait or landscape photographs, the direction (image horizontal direction at the display of the image) of the foreground region positional aberration is not parallel or not perpendicular to the outer borders of the images as illustrated by arrow 210 in FIG. 14B. In this case, the image processing unit 206 clips the rectangular image regions surrounded by edges that run parallel or perpendicular to the image horizontal direction at the display of the image, from the converted image and the second image as illustrated by the dashed line in FIG. 14B. Moreover, based on the angle differences between the image horizontal direction at the display of the image, and the directions of the outer borders of the converted image and the second image, the image processing unit 206 rotates the clipped rectangular image region such that the edges that surround the regions run parallel or perpendicular to the outer borders of the converted image and the second image (see FIG. 14C and FIG. 14D).

According to the above processing, the stereoscopic image can be displayed such that the parallax direction of the stereoscopic image corresponds to the direction in which the eyes of the viewer are arranged without conducting processing to rotate the stereoscopic image to be displayed in response to the determined image horizontal direction at the display of the image. In addition to the above processing, further processing to enlarge the rotated rectangular regions may be conducted so that the sizes of the rectangular regions match the sizes of the converted image and the second image. Similar to the explanation of FIG. 12, a computer may be made to function as the stereoscopic image acquiring device 200 by causing the computer to read a stereoscopic image acquisition program from the storage unit and execute the same to cause the computer to function as the stereoscopic image acquiring device 200.

Moreover, although the above explanation describes an aspect in which the image orientation at the shooting is determined in relation to one group of images photographed in order by a single imaging unit, the present invention is not limited as such. When multiple moving images are photographed in sequence by multiple imaging units to create stereoscopic moving images, a direction in which the eyes of the viewer observing the stereoscopic image is arranged is assumed, and a positional relationship of the multiple imaging units is decided so that the parallax is formed in the assumed direction between the photographed multiple moving images. As a result, the disclosed invention may also be applied to determining the image orientation at the shooting of the abovementioned multiple moving images.

Although the above explanation describes an aspect in which the stereoscopic image acquisition program 150 is stored in the storage unit 146, the stereoscopic image acquisition program 150 may also be stored in a portable recording medium such as a CD-ROM, DVD-ROM, or USB memory device and the like.

All documents, patent applications, and technical standards described herein are incorporated by reference in the present specification to the same degree as when individual documents, patent applications, and technical standards are incorporated by reference specifically and individually.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:
1. An image processing device comprising:
a processor; and
a memory which stores a plurality of instructions, which when executed by the processor, cause the processor to:
input a first image and a second image and detect a first positional aberration between the first image and the second image, the detected first positional aberration being a background region positional aberration;

correct the first image and the second image based on the background region positional aberration;

detect a direction of a foreground parallax between the corrected first image and the corrected second image; and determine an image orientation at a display of the first image and the second image based on the detected direction of the foreground parallax.

2. The image processing device according to claim 1, wherein the processor is configured to determine that the detected direction of the foreground parallax is an image horizontal direction at the display of the first image and the second image.

3. The image processing device according to claim 1, wherein the processor is configured to detect the foreground parallax between the corrected second image and the corrected first image in multiple directions in the images, and detect a second positional aberration direction, based on the detection of the foreground parallax between the corrected second image and the corrected first image in the multiple directions in the images.

4. The image processing device according to claim 3, wherein:

the first image and the second image are images photographed in different positions in a horizontal direction with respect to an object; and the processor is configured to:

detect an amount of the foreground parallax in a first direction of the corrected first image, detect an amount of the foreground parallax in a second direction perpendicular to the first direction, detect a direction in which a magnitude of a detected amount of a positional aberration is largest among the amount detected in the first direction and the amount detected in the second direction, and set the detected direction as the second positional aberration direction; and determine the first direction as the horizontal direction of an image to be displayed, when the second positional aberration direction is the first direction, and determine the second direction as the horizontal direction of the image to be displayed, when the second positional aberration direction is the second direction.

5. The image processing device according to claim claim 1, wherein the processor is configured to:

set a region whose second positional aberration size in an image is not less than a threshold as a foreground region; and detect the first positional aberration of a region excluding the foreground region in the image when the foreground region is set.

6. The image processing device according to claim 1, wherein the processor is configured to:

individually acquire the first image and the second image;
hold the acquired first image;
hold the acquired second image;
detect the first positional aberration between the held first image and the held second image.

7. The image processing device according to claim claim 6, wherein the processor is configured to:

acquire multiple images in a sequential order, and
update an image held as the second image to a new acquired image each time a new image is acquired.

8. The image processing device according to claim 1, wherein the processor is configured to:

add information representing the determined image orientation to image data of the first image as attribute information of the first image and to image data of the second image as attribute information of the second image.

9. The image processing device according to claim 1, wherein the processor is configured to:

convert image data such that the image orientation of the image data matches the determined image orientation before saving the image data, when the image data of the first image and of the second image is to be saved and the image orientation of the image data disagrees with the determined image orientation.

10. The image processing device according to claim 1, wherein:

outer borders of the first image and the second image are rectangular; and the processor is configured to:

detect, in three or more directions in the images, the foreground parallax between the corrected second image and the corrected first image, and detect a direction whose second positional aberration size is largest among the three or more directions, as the direction of the foreground parallax;

determine that the detected direction of the foreground parallax is an image horizontal direction at the display of the first image and the second image; and clip, when the image horizontal direction at the display of the first image and the second image is a direction not parallel and not perpendicular to edges of the outer borders of the first image and the second image, rectangular regions surrounded by edges that are parallel or perpendicular to the image horizontal direction at the display of the first image and the second image, and rotate the edges of the clipped rectangular regions so that the edges of the clipped rectangular regions are parallel or perpendicular to the edges of the outer borders of the first image and the second image.

11. A detection method of a communication system comprising:

inputting, by a processor, a first image and a second image, and detecting, by the processor, a first positional aberration between the first image and the second image, the detected first positional aberration being a background region positional aberration;

correcting, by the processor, the first image and the second image based on the background region positional aberration;

detecting, by the processor, a direction of a foreground parallax between the corrected first image and the corrected second image; and determining, by the processor, an image orientation at a display of the first image and the second image based on the detected direction of the foreground parallax.

12. A non-transitory computer-readable recording medium including a program, the program causing a processor to execute operations of an image processing method, the image processing method comprising:

inputting, by the processor, a first image and a second image and detecting, by the processor, a first positional aberration between the first image and the second image, the detected first positional aberration being a background region positional aberration;

correcting, by the processor, the first image and the second image based on the background region positional aberration;

detecting, by the processor, a direction of a foreground parallax between the corrected first image and the corrected second image; and determining, by the processor, an image orientation at a display of the first image and the second image based on the detected direction of the foreground parallax.

* * * * *